US008880027B1

(12) United States Patent
Darringer

(10) Patent No.: US 8,880,027 B1
(45) Date of Patent: Nov. 4, 2014

(54) AUTHENTICATING TO A COMPUTING DEVICE WITH A NEAR-FIELD COMMUNICATIONS CARD

(75) Inventor: Philip Darringer, Nashua, NH (US)

(73) Assignee: EMC Corporation, Hopkinton, MA (US)

( * ) Notice: Subject to any disclaimer, the term of this patent is extended or adjusted under 35 U.S.C. 154(b) by 102 days.

(21) Appl. No.: 13/339,570

(22) Filed: Dec. 29, 2011

(51) Int. Cl.
*H04M 1/66* (2006.01)

(52) U.S. Cl.
USPC ......... 455/411; 455/410; 455/41.1; 455/41.2; 455/41.3; 726/3; 726/4; 726/9; 726/17; 726/20

(58) Field of Classification Search
USPC ...................... 455/410, 411, 41.1–41.3, 558; 726/1–10, 16–21
See application file for complete search history.

(56) References Cited

U.S. PATENT DOCUMENTS

| | | | | |
|---|---|---|---|---|
| 5,668,876 | A * | 9/1997 | Falk et al. ...................... | 380/271 |
| 7,609,162 | B2 * | 10/2009 | Kim et al. .................. | 340/572.1 |
| 8,380,982 | B2 * | 2/2013 | Miyabayashi et al. ........ | 713/156 |
| 2007/0186105 | A1 * | 8/2007 | Bailey et al. .................. | 713/168 |
| 2007/0283427 | A1 * | 12/2007 | Gupta et al. ....................... | 726/9 |
| 2008/0028447 | A1 | 1/2008 | O'Malley et al. | |
| 2010/0145860 | A1 * | 6/2010 | Pelegero ......................... | 705/71 |
| 2011/0174874 | A1 * | 7/2011 | Poznansky et al. ............ | 235/379 |
| 2011/0212707 | A1 * | 9/2011 | Mahalal ......................... | 455/411 |
| 2011/0278357 | A1 * | 11/2011 | Gannon ......................... | 235/379 |
| 2012/0030047 | A1 * | 2/2012 | Fuentes et al. ............... | 705/26.1 |
| 2012/0052800 | A1 * | 3/2012 | Bona et al. ................... | 455/41.1 |
| 2012/0108296 | A1 * | 5/2012 | Coppinger ..................... | 455/558 |
| 2012/0137374 | A1 * | 5/2012 | Tarulli et al. ..................... | 726/28 |
| 2012/0217303 | A1 * | 8/2012 | Krawczewicz et al. ........ | 235/488 |
| 2012/0272307 | A1 * | 10/2012 | Buer .................................. | 726/9 |
| 2012/0286928 | A1 * | 11/2012 | Mullen et al. ................. | 340/5.61 |
| 2012/0309354 | A1 * | 12/2012 | Du .................................. | 455/411 |
| 2013/0036456 | A1 * | 2/2013 | Boysen et al. ...................... | 726/4 |
| 2013/0084798 | A1 * | 4/2013 | Faithorn ........................ | 455/41.1 |
| 2013/0103528 | A1 * | 4/2013 | Carnevale ................... | 705/26.1 |
| 2013/0247146 | A1 * | 9/2013 | Lyon ................................. | 726/3 |

OTHER PUBLICATIONS

"BlackBerry Smart Card Reader," retrieved from http://na.blackberry.com/eng/ataglance/security/products/smartcardreader on Dec. 1, 2011.
Ortiz-Yepes, Diego A., "Enhancing Authentication in eBanking with NFC-Enabled Mobile Phones," retrieved from http://ercim-news.ercim.eu/en76/rd/enhancing-authentication-in-ebanking-with-nfc-enabled-mobile-phones on Nov. 8, 2011.
Philpott et al., "Multi-Channel Transaction Signing," U.S. Appl. No. 12/820,829, filed Jun. 22, 2010.
Weigold et al., "The Zurich Trusted Information Channel—An Efficient Defence Against Man-in-the-Middle and Malicious Software Attacks," IBM Zurich Research Laboratory, 10 pages; In P. Lipp, A.-R. Sadeghi, and K.-M. Koch (Eds.): TRUST 2008, LNCS 4968, pp. 75-91, 2008. Springer-Verlag Berlin Heidelberg.

\* cited by examiner

*Primary Examiner* — Mehmood B Khan
(74) *Attorney, Agent, or Firm* — BainwoodHuang

(57) ABSTRACT

A method is performed by a computing device. The method includes, (a) at the computing device, wirelessly receiving an authentication code from an authentication card via near-field communications (NFC), (b) providing the authentication code received wirelessly via NFC to an authentication service configured to authenticate the user of the computing device based on the authentication code, and (c) in response to the authentication service authenticating the user based on the authentication code received wirelessly via NFC, providing the user with access to a resource via the computing device. Analogous computer program products and apparatuses are also provided described.

18 Claims, 4 Drawing Sheets

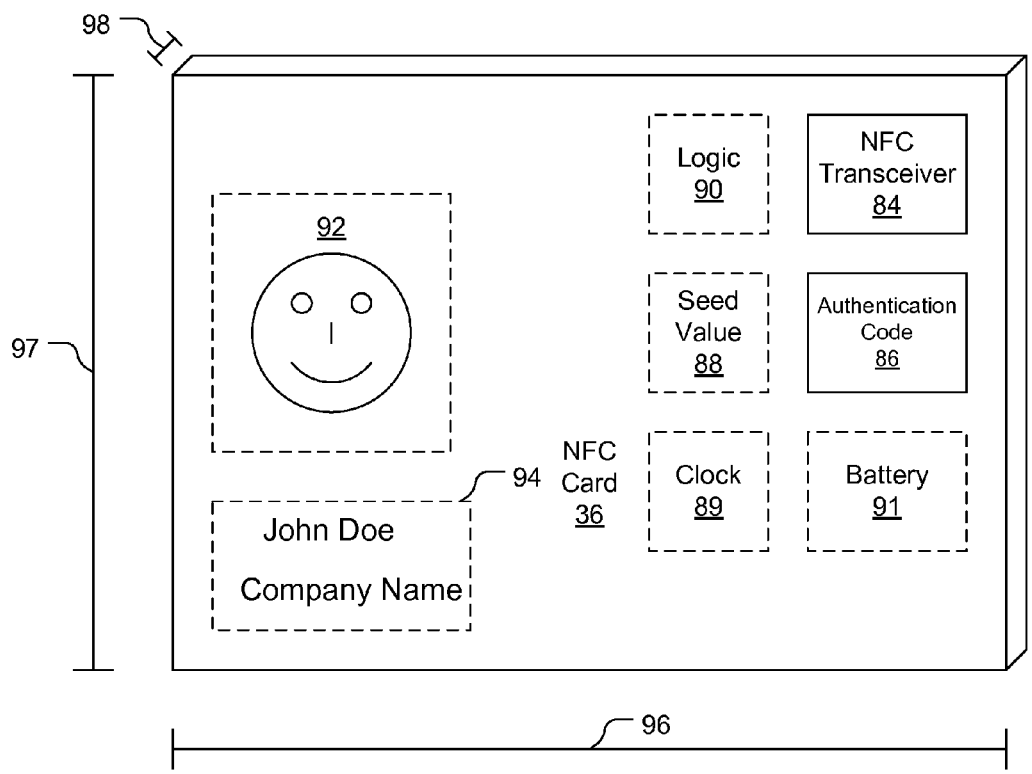

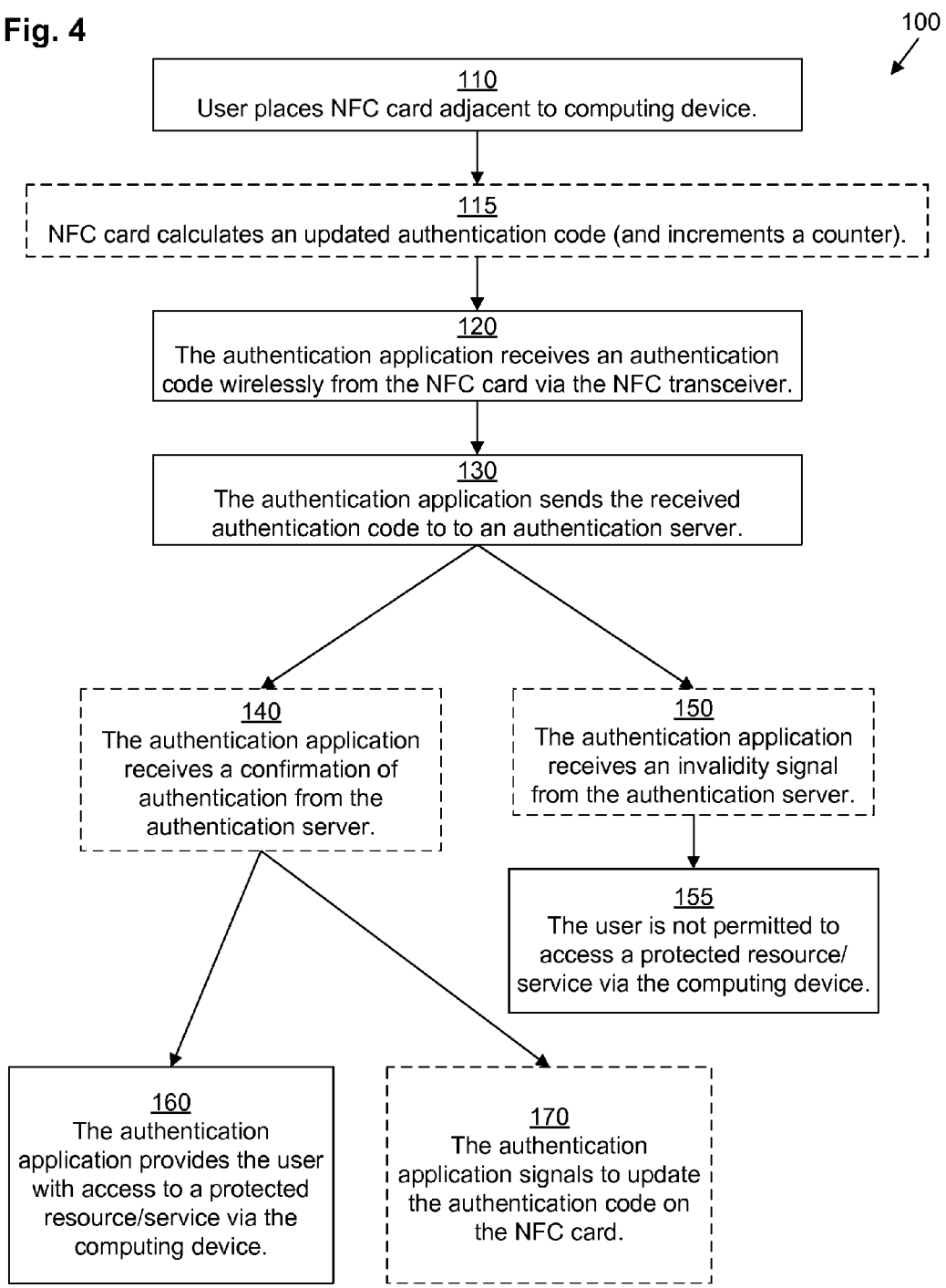

AUTHENTICATING TO A COMPUTING DEVICE WITH A NEAR-FIELD COMMUNICATIONS CARD

BACKGROUND

In an increasingly connected world, computer users often have a need to access sensitive applications and data on a variety of devices in a secure manner. Thus, some corporations have given employees Blackberry smart phones capable of securely accessing corporate resources over a cellular network. In order to further authenticate the employees, some organizations have also given employees smart cards and smart card readers. The employee physically places the smart card in the smart card reader, which is connected to the employee's Blackberry device. If the employee's smart card is not inserted in the smart card reader, or if the smart card reader is no longer in communication with the Blackberry device, the Blackberry device may be configured to lock and not permit the employee to access the Blackberry device.

SUMMARY

Unfortunately, the above-described approach suffers from deficiencies. In particular, the smart card reader is a bulky and expensive piece of equipment that is difficult for employees to carry around with them at all times. Instead, it would be desirable to provide secure access without needing such a device.

The present disclosure is directed to techniques for using near-field communications (NFC) to authenticate to or through a device using a contactless (or wireless) NFC card. A user may wish to access a resource, such as a organization-managed resource, possibly away from an organization office. Techniques are provided herein to allow the user to access the resource using a mobile device (such as a cellular smart phone or cellular tablet) or a personal computer device by allowing the user to authenticate to the device by placing an NFC authentication card in proximity to an NFC reader of the device so that authentication information can be wirelessly exchanged using NFC. By using NFC, the need for a bulky external smart card reader is obviated, since many mobile devices have embedded NFC readers. In addition, the user is able to authenticate to multiple NFC-capable devices without the need for specialized equipment.

In one embodiment, a method is provided. The method is performed by a computing device. The method includes, (a) at the computing device, wirelessly receiving an authentication code from an authentication card via NFC, (b) providing the authentication code received wirelessly via NFC to an authentication service configured to authenticate the user of the computing device based on the authentication code, and (c) in response to the authentication service authenticating the user based on the authentication code received wirelessly via NFC, providing the user with access to a resource via the computing device. Embodiments directed to analogous computer program products and apparatuses are also provided.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

FIG. 3 illustrates an example apparatus according to various embodiments.

FIG. 4 illustrates an example method according to various embodiments.

DETAILED DESCRIPTION

A user may wish to access a resource, such as an organization-managed resource, possibly away from an organization office. Techniques are provided herein to allow the user to access the resource using a mobile device (such as a cellular smart phone or cellular tablet) or a personal computer device by allowing the user to authenticate to the device by placing a near-field communications (NFC) authentication card in proximity to an NFC-reader of the device so that authentication information can be wirelessly exchanged using NFC.

Figure 1:
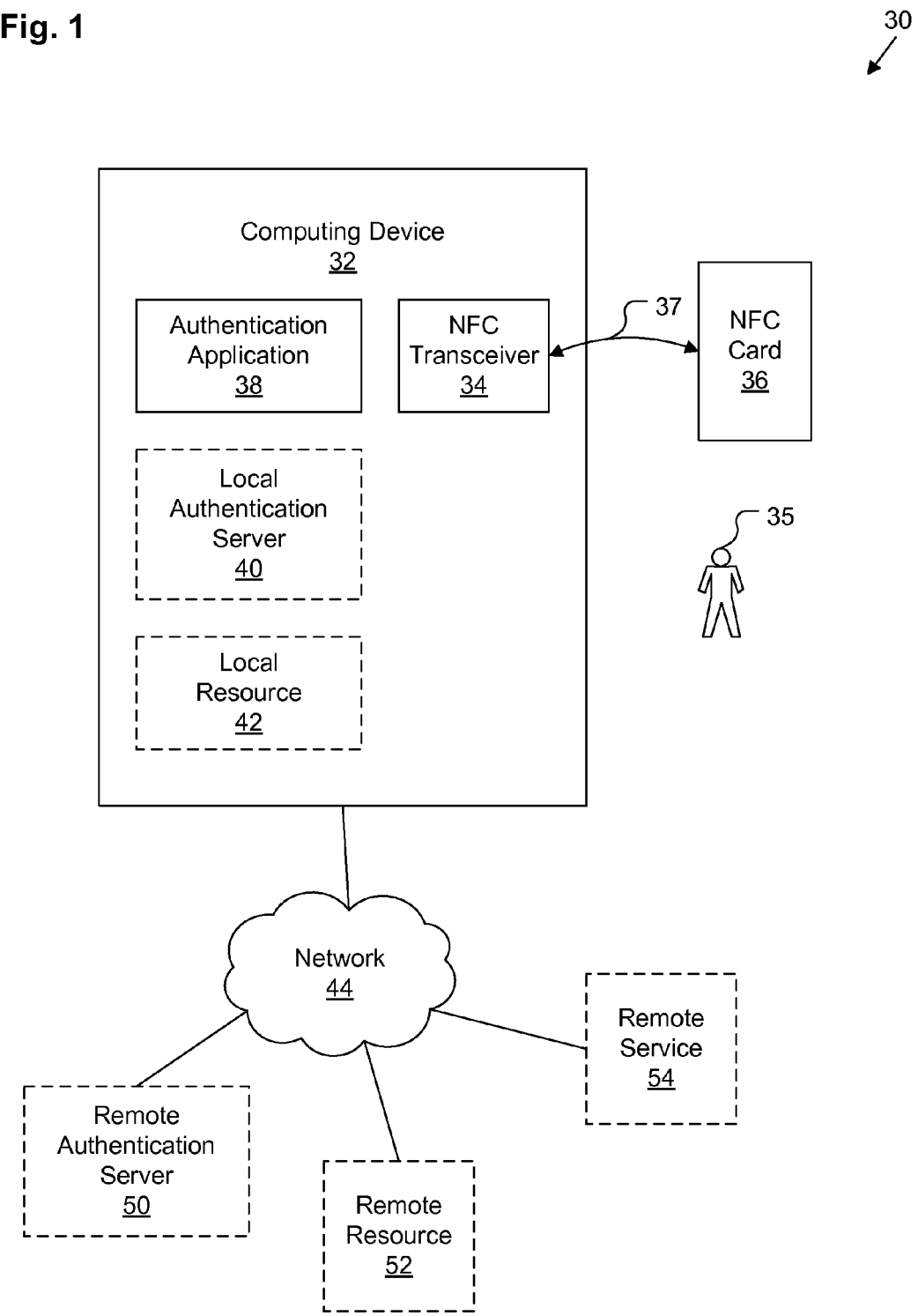
FIG. 1 illustrates an example system for use in connection with various embodiments.

FIG. 1 depicts a system 30 for use in connection with various embodiments. System 30 includes a computing device 32. Computing device 32 may be, for example, a personal computer, a desktop computer, a workstation computer, a server computer, an enterprise server computer, a laptop computer, a mobile computer, a portable computing device, a tablet computing device, a smart phone, etc.

Computing device 32 includes an NFC transceiver 34. In some embodiments (e.g., when the computing device 32 is a mobile device), NFC transceiver 34 is embedded within the computing device 32, while in other embodiments (e.g., when the computing device 32 is a desktop computer, although some desktop computers may instead have embedded NFC transceivers), NFC transceiver 34 is an add-on component external to the computing device 32. NFC transceiver 34 operates in accordance with well-known standards as an NFC initiator device. In particular, NFC transceiver 34 is configured to engage in low-powered radio or wireless communications with an NFC card 36 (in possession of a user 35) placed within about 4 centimeters of the NFC transceiver 34 across a wireless link 37, although, in some configurations, the NFC transceiver 34 may be configured to communicate with the NFC card 36 when placed up to about 20 centimeters away. The NFC card 36 is an NFC target device. Further detail with respect to the NFC card 36 is provided below, in connection with FIG. 3.

Computing device 32 runs an authentication application 38 that is configured to receive signals from the NFC transceiver 34, communicate with an authentication server (also referred to as an authentication service), and selectively allow the user 35 to access a resource.

In some embodiments, the authentication server is a local authentication server application 40 also running on the computing device 32. In these embodiments, the resource is a local resource 42 stored on the computing device 32 itself. Further detail with respect to the local resource is provided below, in connection with FIG. 2.

In other embodiments, the authentication server is a remote authentication server 50 which the computing device 32 is in communication with across a network 44. In some of these embodiments, the resource is a local resource 42 stored on the computing device 32 itself. In other of these embodiments, the resource is a remote resource 52 (e.g., a file stored on a file server or some other data source, such as an application configured to stream data) which the computing device 32 is in communication with across network 44. In yet other of these embodiments, the resource is a remote service 54 (e.g., a website) which the computing device 32 is in communication with across network 44. In all of these embodiments, the resource may be located within a management domain managed by the remote authentication server 50. In some embodiments (not depicted), remote resource 52 and/or remote service 54 may be connected to network 32 via remote authentication server 50, such that remote resource 52 and/or remote service 54 cannot be accessed without going through the remote authentication server 50. In other embodiments (depicted), remote resource 52 and/or remote service 54 may be directly connected to network 32, such that remote resource 52 and/or remote service 54 can be accessed without going through the remote authentication server 50, but remote resource 52 and/or remote service 54 are configured to not permit access without authorization (e.g., via an authentication token) from remote authentication server 50.

Figure 2:
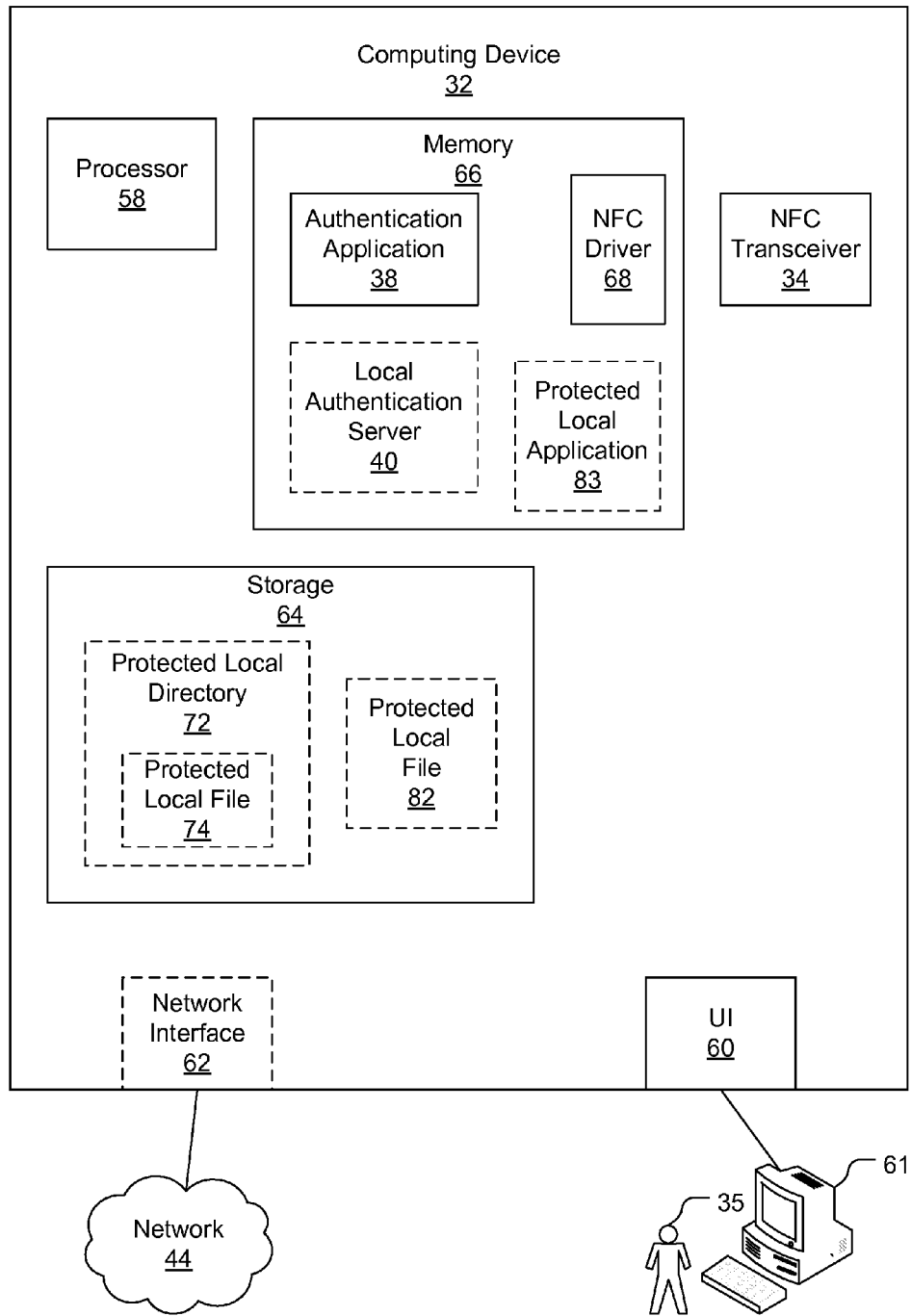
FIG. 2 illustrates an example apparatus according to various embodiments.

FIG. 2 depicts an example computing device 32 of various embodiments in further detail. In addition to having a powered NFC transceiver 34, computing device 32 also includes a processor 58, a user interface (UI) 60, storage 64, memory 66, and an optional network interface 62.

Processor 58 may be, for example, a central processing unit, a microprocessor, a collection of multiple microprocessors, a digital signal processor, a field-programmable gate array, a collection of circuits configured to perform various operations, or another similar device or set of devices configured to perform operations, typically based on instructions stored in memory 66. It should be understood that, when a piece of software is described herein as executing, running, operating, or performing a method, function, step, operation, etc., the method, function, step, or operation is actually performed by the processor 58. In embodiments in which the processor 58 executes code stored in memory 66, then the method, function, step, or operation is performed by the processor 58 while executing code of the software stored in memory 66. In embodiments in which the processor 58 is a collection of circuits configured to perform specific operations, then the method, function, step, or operation is performed by the processor 58 in the form of executing code embedded within the structure of the processor 58 design itself.

UI 60 may include circuitry configured to connect to one or more UI devices 61 in order to receive and transmit information to user 35. UI devices 61 may include, for example, a display monitor, a touch-sensitive display device, a keyboard, a keypad, a mouse, a tracking pad, a tracking ball, a microphone, a speaker, other similar devices, or some combination thereof. In some embodiments, one or more of the UI devices 61 may be embedded within the computing device itself, such as, for example, a touch-sensitive display screen embedded within a cellular smart phone or tablet. A display of the set of UI devices 61 may be used to display a representation of a protected resource that the user 35 wishes to access. The circuitry of UI 60 may include, for example, a graphics card, a graphics accelerator, a sound card, a serial port, a parallel port, an analog to digital converter, a digital to analog converter, or similar devices having similar functionality for connecting to UI devices 61.

In some embodiments, computing device 32 also may include a network interface 62 for connecting to network 44. Network 44 may be, for example, a wide area network (WAN), a local area network (LAN), a point-to-point connection, a wireless cellular data network, etc. Network interface 62 may be, for example, an Ethernet adapter, a wireless network adapter and antenna, a cellular transceiver chip and antenna, etc.

Storage 64 is a form of non-volatile memory for storing files and data. Storage 64 may be, for example, a hard disk drive, a floppy diskette drive, a CD-ROM drive, a DVD drive, a Blu-ray drive, a solid-state disk drive, magnetic storage, optical storage, flash memory, some combination thereof, or another similar device or set of devices configured to store application programs and or application data. Storage 64 may store various files contained within various directories (or folders) in a hierarchical storage system structure. In some embodiments, one or more of the directories may be a protected directory 72, access to which is controlled by the authentication application 38 as the protected local resource 42. Typically, all resources (such as files and directories) within a protected directory 72 are also protected, such as protected file 74. In other embodiments, instead of a directory being the protected local resource 42, a protected local file 82 may be the protected local resource 42. In yet other embodiments, there may be a combination of protected local directories 72 and protected local files 82 making up several protected local resources 42. Storage 64 may also store additional components (not depicted), such as an operating system, other application programs, application data, user data, etc.

Storage 64 may include a computer program product. The computer program product stores a computer program within a tangible non-transitory computer-readable storage medium. The computer program, when executed by processor 58 (and stored in memory 66), is configured to cause the processor 58 to perform a method (see FIG. 4, below) according to various embodiments. In some embodiments, the computer program is the authentication application 38.

Memory 66 may include, for example, system memory, cache memory, volatile memory, random access memory, some combination thereof, or another similar device or set of devices configured to store running software and or data. In addition to storing the authentication application 38, memory 66 also stores an NFC driver 68 for interfacing with the NFC transceiver 34. Memory 66 may also store the local authentication server application 40, in embodiments in which the authentication is performed locally rather than at a remote authentication server 50. Memory 66 may also store a protected local application 83, which may provide access to a particular protected local file 82 or other protected data stored within protected local application 83. Memory 66 may also store additional components (not depicted), such as an operating system, other application programs, application data, user data, etc.

FIG. 3 depicts an example NFC card 36 of various embodiments in further detail. NFC card 36 includes an NFC transceiver 84 embedded therein and an authentication code 86 stored therein. NFC transceiver 84 is configured to send the stored authentication code 86 to a remote NFC transceiver (e.g., NFC transceiver 34) upon the remote NFC transceiver initiating an NFC communication session.

In some embodiments, NFC card 36 is a passive, unpowered card. In these embodiments, NFC transceiver 84 wirelessly receives all power needed to be able to wirelessly send the authentication code 86 to the initiating NFC transceiver 34 from the initiating NFC transceiver 34 itself upon the initiating NFC transceiver 34 sending an initiation signal to the NFC card 36.

In other embodiments, NFC card 36 is an active device, also containing logic 90. In some of these embodiments, the NFC card 36 is unpowered, in which case NFC transceiver 84 receives power from the initiating NFC transceiver 34. In other of these embodiments, the NFC card 36 is powered, in which case NFC transceiver 84 is powered by a local power source, such as a battery 91.

In some embodiments in which NFC card 36 is active, upon receiving an initiation signal from the remote NFC transceiver 34, NFC transceiver 84 reads the authentication code 86 and wirelessly sends it to the initiating NFC transceiver 34. Subsequently, the NFC transceiver 84 receives an updated replacement authentication code from the initiating NFC transceiver 34. Logic 90 is configured to store the updated replacement authentication code as the new authentication code 86.

In other embodiments in which the NFC card 36 is active, NFC card also stores an embedded seed value 88, which is used by the logic 88 to automatically update the value of the authentication code 86. This automatic updating can be done in two ways: either before or after sending the authentication code 86 to the initiating NFC transceiver 34. In some embodiments, upon receiving an initiation signal from the initiating NFC transceiver 34, logic 90 reads the seed value 88 and calculates an updated value of the authentication code 86, allowing the NFC transceiver 84 to send the value of the updated authentication code 86 wirelessly to the remote NFC transceiver 34. The calculation of the updated authentication code 86 by the logic 90 may be based on a standardized algorithm, e.g., using a counter or an embedded clock 89 (which provide a predictably varying parameter, such as a synchronized counter value or time value) to generate the next authentication value 86 based on the seed value 88 using a pseudo-random number generation algorithm, also known to the authentication server 40, 50. In some embodiments, the NFC transceiver 84 may automatically increment the counter after calculating the updated authentication code 86, while in other embodiments, the NFC transceiver 84 may receive an updated counter value or an instruction to increment the counter upon successful authentication. In other embodiments, the NFC transceiver 34 may send the value stored as the authentication value 86 directly upon receiving the initiation signal, the logic 90 only updating the authentication value 86 upon the NFC transceiver 84 receiving the updated counter value or instruction to increment the counter upon successful authentication. In other embodiments, the initiating NFC transceiver 34 wirelessly sends a challenge code with the initiation signal to the remote NFC transceiver 84, upon which the logic 90 reads the seed value 88 and calculates an updated value of the authentication code 86 by cryptographically combining the seed value 88 and the challenge code, allowing the NFC transceiver 84 to send the value of the updated authentication code 86 wirelessly to the remote NFC transceiver 34 as a response in a challenge/response scheme.

In some embodiments, the NFC card 36 may also function as an identification card, such as a corporate or organization badge. In these embodiments, the NFC card 36 may have imprinted thereon a photograph 92 of the user 35 as well as identification information 94 regarding the user 35, such as the name of the user 35 and the name of the company, as well as any other information that the corporation or organization deems important to be imprinted on a badge. In other embodiments, NFC card 36 may be a separate device that does not function as an identification card.

In some embodiments, particularly when functioning as a corporate badge, NFC card may be a thin, wallet-sized card. The card may be considered "thin" when it is less than about 2 millimeters ($1/12.7$ inches) in thickness 98. The card may be considered "wallet-sized" when its horizontal dimension 96 is within the range of 3 inches to 4 inches, and its vertical dimension 97 is in the range of 1.75 inches to 2.5 inches. A typical thin, wallet-sized card might measure, for example, 3.375 inches long by 2.125 inches high by $1/16$ of an inch thick.

In operation, the system 30 depicted in FIGS. 1-3 may be used to perform a method 100, depicted in FIG. 4. Method 100 may be performed at various times when the user 35 wishes to access a protected resource using the computing device 32, such as local resource 42, remote resource 52 or remote service 54. Upon the user 35 attempting to access the protected resource, authentication application 38 determines if the user 35 is authorized to access the protected resource. In some embodiments, if the user 35 has already been authenticated (within a pre-determined timeout period), then the authentication application 38 allows access, but if the user 35 is now first attempting to access the resource, then the authentication application 38 prompts the user 35 to begin the authentication process by using his NFC card 36 in the performance of method 100.

In other embodiments, the authentication application 38 may prompt the user 35 to begin the authentication process by using his NFC card 36 in the performance of method 100 even if the user has previously accessed the resource recently. In these embodiments, a risk-based authentication scheme may be used, whereby the method 100 is used as a supplemental form of authentication only when the authentication application 38 or the authentication server 40, 50 determines that a particular access of the protected resource is particularly high-risk.

In step 110, the user 35 places the NFC card 36 adjacent to the computing device 32, preferably within about 4 centimeters of the NFC transceiver 34 of the computing device 32. If, for example, the computing device 32 is a smart phone, the user 35 will typically place the NFC card 36 directly behind the smart phone to be read by the NFC transceiver 34 embedded in the back of the smart phone. In some embodiments, particularly when the NFC card 36 is a passive NFC device, step 110 is performed in response to the NFC transceiver 34 sending a wireless initiation signal to the NFC transceiver 84.

In optional step 115, performed in some embodiments, NFC logic 90 calculates and stores an updated authentication code 86 upon NFC transceiver 84 receiving the initiation signal. In some of these embodiments, NFC logic 90 also increments a counter for use the next time an initiation signal is received.

In step 120, the authentication application 38 receives the authentication code 86 from the NFC card 36. This is accomplished by NFC transceiver 34 wirelessly receiving the authentication code 86 from the NFC card 36 over wireless link 37, and then the NFC driver 68 transmitting the received authentication code 86 from the NFC transceiver 34 to the authentication application 38.

In step 130, authentication application 38 sends the received authentication code 86 to an authentication server—either local authentication server 40 or remote authentication server 50, depending upon the configuration. In some embodiments, prior to sending the authentication code 86, authentication application 38 engages in a dialog with the user 35 via UI 60 in order to obtain a username and/or password (or similar information, such as a personal identification number, or PIN) from the user 35 to be used in conjunction with the authentication code 86 for multi-factor authentication for more robust security. In such embodiments, the authentication application 38 may send the username and/or password to the authentication server 40, 50 together with the authentication code 86.

The authentication server 40, 50 determines, based upon an expected value of the authentication code 86 (and whether that value is consistent with the username and/or password), whether to authenticate the user 35. In some embodiments, the user 35 may be authenticated only with respect to certain particular protected resources, while other protected resources require a separate or new authentication to be performed. Upon authenticating the user 35, the authentication server 40, 50 sends a signal back to the authentication application 38. Depending on the embodiment, this signal may be as simple as a 1-bit yes/no value, it may be an encrypted yes/no value, or it may be an encrypted or unencrypted multi-bit value that encodes whether or not the user 35 is authenticated to access the particular protected resource in question. In other embodiments the signal may include information about whether or not the user 35 has permission to access each of a set of protected resources.

Further processing depends on the response of the authentication server 40, 50. In optional step 140, the authentication application 38 receives an affirmative signal from the authentication server 40, 50, indicating that authentication of the user 35 (for the particular protected resource) has been confirmed, in which case, operation proceeds to step 160 and optional step 170 (which may be performed in parallel with each other, or in any relative order). In step 160, the authentication application 38 provides the user 35 with access the protected resource via the computing device 32. Thus, for example, if the user 35 wished to access a protected spreadsheet containing the budget projections for the user's company, after the authentication application 38 confirms that the user 35 has been authenticated, a spreadsheet application operating on the computing device 32 (e.g., a tablet) would be able to open the protected spreadsheet file (which may be stored either on the computing device 32 itself as a local resource 42 or on the network 40 as remote resource 52 within a corporate management domain) and display the budget projections for the user's company as a spreadsheet on a UI device 61, such as the touch-sensitive display screen embedded within the tablet.

In step 170, in some embodiments in which the NFC card 36 is active, the authentication application 38 signals the NFC card 36 that the authentication code 86 should be updated. In one embodiment the authentication application 38 sends a new or updated code to the NFC card 36 to be stored as the new authentication code 86 by logic 90. In another embodiment, the authentication application 38 sends a completion signal to the NFC card 36. In that event, the NFC card 36 is configured to automatically update the authentication code 86 based on the seed value 88 and the current time or an incremented counter value, as described above, in connection with FIG. 3.

In alternative optional step 150, the authentication application 38 receives a negative response from the authentication server 40, 50, indicating that the user 35 does not have permission to access the protected resource. Operation proceeds to step 155, in which the authentication application 38 refrains from providing the user 35 with access to the protected resource in question.

In some alternative embodiments, such as when the resource is a local resource 42, in step 140, the authentication application 38 merely receives from the authentication server 40, 50 a confirmation that the user 35 is who he says he is, and it is up to the authentication application 38 to determine if the user 35 is authorized to view any particular protected resource based on permissions associated with that user 35 in a permissions database. In these alternative embodiments, step 140 can proceed to either step 160 (when the user 35 is authorized to view the particular protected resource in question) or to step 155 (when the user 35 is not authorized to view the particular protected resource in question).

Thus, techniques have been described for selectively allowing the user 35 to access, via computing device 32, a protected resource, when the user 35 is able to wirelessly connect his NFC card 36 containing a correct authentication code 86 to the computing device 32 using NFC.

While various embodiments of the invention have been particularly shown and described, it will be understood by those skilled in the art that various changes in form and details may be made therein without departing from the spirit and scope of the invention as defined by the appended claims.

It should be understood that although various embodiments have been described as being methods, computer programs embodying these methods are also included. Thus, one embodiment includes a tangible computer-readable medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer which is programmed to perform one or more of the methods described in various embodiments.

Furthermore, it should be understood that all embodiments which have been described may be combined in all possible combinations with each other, except to the extent that such combinations have been explicitly excluded.

Finally, nothing in this Specification shall be construed as an admission of any sort. Even if a technique, method, apparatus, or other concept is specifically labeled as "prior art" or as "conventional," Applicants make no admission that such technique, method, apparatus, or other concept is actually prior art under 35 U.S.C. §102, such determination being a legal determination that depends upon many factors, not all of which are known to Applicants at this time.

What is claimed is:

1. A method performed by a computing device, the method comprising:
    at the computing device, wirelessly receiving an authentication code from an authentication card via near-field communications (NFC);
    providing the authentication code received wirelessly via NFC to an authentication service configured to authenticate a user of the computing device based on the authentication code; and
    in response to the authentication service authenticating the user based on the authentication code received wirelessly via NFC, providing the user with access to a resource via the computing device;
    wherein wirelessly receiving the authentication code from the authentication card via NFC is performed in response to the user attempting to access the resource via the computing device;
    wherein the method further comprises, subsequent to providing the user with access to the resource via the computing device:
        receiving a follow-up attempt request from the user to attempt to access the resource via the computing device again after a period of time;
        performing a risk-based analysis to determine whether access to the resource is high-risk or low-risk; and
        selectively:
            allowing the user to access the resource without further use of the authentication card if the access to the resource has been determined to be low-risk by the risk-based analysis; and prompting the user to present the authentication card for further authentication if the access to the resource has been determined to be high-risk by the risk-based analysis.

2. The method of claim 1 wherein the authentication card is a thin, wallet-sized identification card having a photograph of the user and identifying text imprinted thereon.

3. The method of claim 2 wherein:
the thin, wallet-sized identification card is an unpowered, passive NFC device, having a pre-assigned code associated with the user permanently encoded therein, the pre-assigned code also being stored by the authentication service; and
authenticating the user includes comparing the authentication code received wirelessly via NFC to the pre-assigned code associated with the user stored by the authentication service.

4. The method of claim 1 wherein:
the authentication card is an active NFC device, having a pre-assigned code associated with the user temporarily encoded therein, the pre-assigned code also being stored within the computing device;
authenticating the user includes comparing the authentication code received wirelessly via NFC to the pre-assigned code associated with the user stored within the computing device; and
the method further comprises:
reassigning a new code to be associated with the user; and
wirelessly sending the reassigned code to the authentication card via NFC to replace the preassigned code temporarily encoded within the authentication card to be used in a future authentication.

5. The method of claim 1 wherein:
the authentication card is a powered, active NFC device having logic configured to dynamically calculate the authentication code based on a seed value and a predictably varying parameter;
authenticating the user includes:
dynamically calculating an expected code based on the seed value and the predictably varying parameter; and
comparing the authentication code received wirelessly via NFC to the dynamically calculated expected code.

6. The method of claim 1 wherein the computing device is a mobile telecommunications device.

7. The method of claim 1 wherein the computing device is a network-connected personal computer.

8. The method of claim 1 wherein:
the method further includes running the authentication service on the computing device to authenticate the user of the computing device based on the authentication code;
the resource is a resource local to the computing device; and
providing the user with access to the resource via the computing device includes permitting the user to access the resource local to the computing device.

9. The method of claim 8 wherein the resource local to the computing device is a local application running on the computing device, access to the resource including access to data stored within the local application.

10. The method of claim 8 wherein the resource local to the computing device is a local file stored on storage local to the computing device.

11. The method of claim 1 wherein providing the authentication code to an authentication service includes sending the authentication code to a remote authentication server for remote authentication.

12. The method of claim 11 wherein providing the user with access to the resource via the computing device includes displaying to the user, via a user interface local to the computing device, data from a remote data source stored on a remote data server, the remote data server being in a management domain managed by the remote authentication server.

13. The method of claim 11 wherein providing the user with access to the resource via the computing device includes providing the user, via a user interface local to the computing device, with access to a remote service hosted on a remote web server, the remote web server being in a management domain managed by the remote authentication server.

14. An apparatus comprising:
a near-field communications (NFC) transceiver;
a processor; and
memory, the memory storing a set of instructions, which when executed by the processor, cause the processor to perform the following operations:
wirelessly receiving, via the NFC transceiver, an authentication code from an authentication card;
providing the authentication code received wirelessly via the NFC transceiver to an authentication service configured to authenticate a user of the apparatus based on the authentication code; and
in response to authenticating the user based on the authentication code received wirelessly via the NFC transceiver, providing the user with access to a resource via the apparatus;
wherein the set of instructions, when executed by the processor, cause the processor to wirelessly receive the authentication code from the authentication card via the NFC transceiver in response to the user attempting to access the resource via the apparatus;
wherein the set of instructions stored within memory, when executed by the processor, further cause the processor to, upon receiving a follow-up attempt request from the user to attempt to access the resource via the computing device again after a period of time:
perform a risk-based analysis to determine whether access to the resource is high-risk or low-risk; and
selectively:
allow the user to access the resource without further use of the authentication card if the access to the resource has been determined to be low-risk by the risk-based analysis; and
prompt the user to present the authentication card for further authentication if the access to the resource has been determined to be high-risk by the risk-based analysis.

15. The apparatus of claim 14 wherein:
the apparatus further comprises:
a wireless network interface configured to connect to a remote authentication server and a remote file server via a wireless network, the remote authentication server providing the authentication service, the remote file server storing a remote file as the resource, the remote file server being in a management domain managed by the remote authentication server; and
an embedded touch-sensitive display screen configured to display the remote file as the resource to the user once provided in response to authenticating the user; and
the set of instructions, when executed by the processor, further cause the processor to send the authentication code received wirelessly via the NFC transceiver to the remote authentication server via the wireless network interface for authentication.

16. The apparatus of claim 14 wherein:
the apparatus further comprises:
- local storage, the local storage storing a local file with protected access; and
- a display interface connected to a display screen, the display interface being configured to display on the display screen the local file as the resource to the user once provided in response to authenticating the user; and the set of instructions, when executed by the processor, further cause the processor to send the authentication code received wirelessly via the NFC transceiver to a local authentication service running on the apparatus to authenticate the user of the apparatus based on the authentication code.

17. The apparatus of claim 16 wherein:
the apparatus further comprises:
- a network interface configured to connect to a remote authentication server via a network;
- local storage, the local storage storing a local file with protected access; and
- a display interface connected to a display screen, the display interface being configured to display on the display screen the local file as the resource to the user once provided in response to authenticating the user; and the set of instructions, when executed by the processor, further cause the processor to perform the following operations:
- sending the authentication code received wirelessly via the NFC transceiver to the remote authentication server via the network interface for authentication; and
- receiving a confirmation of authentication from the remote authentication server via the network interface.

18. A computer program product comprising a tangible non-transitory computer-readable storage medium storing instructions, which, when executed by a computing device, cause the computing device to perform the following operations:
- wirelessly receiving an authentication code from an authentication card via near-field communications (NFC);
- providing the authentication code received wirelessly via NFC to an authentication service configured to authenticate a user of the computing device based on the authentication code; and
- in response to the authentication service authenticating the user based on the authentication code received wirelessly via NFC, providing the user with access to a resource via the computing device;

wherein the instructions, when executed by the computing device, cause the computing device to wirelessly receive the authentication code from the authentication card via NFC in response to the user attempting to access the resource via the computing device;

wherein the instructions, when executed by the computing device, further cause the computing device to, upon receiving a follow-up attempt request from the user to attempt to access the resource via the computing device again after a period of time:
- perform a risk-based analysis to determine whether access to the resource is high-risk or low-risk; and
- selectively:
  - allow the user to access the resource without further use of the authentication card if the access to the resource has been determined to be low-risk by the risk-based analysis; and
  - prompt the user to present the authentication card for further authentication if the access to the resource has been determined to be high-risk by the risk-based analysis.

* * * * *